April 28, 1953 J. SILVERMAN 2,637,021
RADAR BEACON CIRCUIT
Filed May 30, 1945 4 Sheets-Sheet 1

INVENTOR.
JAMES SILVERMAN
BY William D. Hall.
ATTORNEY

April 28, 1953   J. SILVERMAN   2,637,021
RADAR BEACON CIRCUIT
Filed May 30, 1945   4 Sheets-Sheet 3

INVENTOR.
JAMES SILVERMAN
BY
William D. Hall,
ATTORNEY

April 28, 1953
J. SILVERMAN
2,637,021
RADAR BEACON CIRCUIT
Filed May 30, 1945
4 Sheets-Sheet 4

INVENTOR.
JAMES SILVERMAN
BY
ATTORNEY

Patented Apr. 28, 1953

2,637,021

UNITED STATES PATENT OFFICE 2,637,021

RADAR BEACON CIRCUIT

James Silverman, Newark, N. J.

Application May 30, 1945, Serial No. 596,711

3 Claims. (Cl. 343—6)

(Granted under Title 35, U. S. Code (1952), sec. 266)

The invention described herein may be manufactured and used by or for the Government for governmental purposes, without the payment to me of any royalty thereon.

My present invention relates to radio-locating systems, and more particularly, to a radio system for determining at a central station, the locations in azimuth and range of one or more mobile stations.

In existing systems of the type to which I refer, the central station, hereinafter called the radar station, may comprise, in general, a transmitter for generating exploratory signals in the form of audio-frequency pulses of radio-frequency energy; an antenna system for radiating said signals over a rotating, directional beam; a receiver for detecting any responses to said exploratory signals; an azimuth-range indicator; and an identification indicator.

The mobile station, which may be carried in an airplane, tank, etc., and which is hereinafter called the beacon, may include, essentially, a normally inoperative transmitter capable of generating, under the control of said exploratory signals, response signals in the form of audio-frequency pulses of radio-frequency energy; apparatus for distinctively coding said response signals so as to enable identification of the beacon; an antenna system for omnidirectionally radiating said coded signals; and a receiver for detecting said exploratory signals and applying the same to said transmitter.

Such a system functions as follows: As the rotating radar beam sweeps past the beacon antenna, the exploratory signals are picked up and applied, through the receiver, to the transmitter. Said transmitter becomes operative under the control of the output of said receiver, and generates the aforementioned coded signals, which are subsequently received back at the radar station, and there applied to the azimuth-range indicator and the identification indicator.

Said azimuth-range indicator generally consists of a cathode-ray tube provided with a radial sweep which is synchronized with the radar pulse transmission, and rotated about the center of the tube in synchronism with the rotation of the radar antenna system, the instantaneous angular position of said sweep being indicative of the direction of the radar transmission at that instant.

The normal intensity of the sweep is usually maintained below the visibility level, and the beacon response is utilized to intensity-modulate said sweep, so that the signals received from each beacon appear upon the face of the indicator tube as an arc whose length is a function, primarily of the width of the radar beam, and whose distance from the center of the tube is a function of the range of the particular beacon.

Now, the accuracy of the azimuth determination is dependent upon the length of the arc appearing upon the face of the tube, and how well the center of said arc can be estimated. Obviously, a long arc makes such determination difficult. In addition, if two or more beacons are closely grouped, their arcs coalesce, forming a blotch which is almost impossible to resolve into individual indications. As a result, which, of a number of detected objects within a large solid angle, are the ones providing response when challenged, is hard to determine.

If said arcs are to be kept small, so as to enhance accuracy and resolution, it is necessary that the radar beam be very narrow. But, the narrower said beam, the more elaborate must the antenna system be, and it is to the reduction of the effective width of said beam, without employing a more elaborate antenna system, that my present invention is primarily addressed.

It is, therefore, an object of my present invention to increase the accuracy and resolution of the azimuth determinations which may be made with a system of the general character described, without the necessity of a more elaborate radar radiating system for producing a beam of extremely narrow width.

It is another object of my present invention more readily to enable the resolution of two or more closely grouped beacon indications which, as above stated, appear as a single blotch on present equipment.

It is still another object of my present invention to attain the foregoing objects, and yet retain one of the advantages of a wide radar beam, namely, a broad solid angle of search.

It is a further object of my present invention to provide relatively simple circuits, adapted to be incorporated in the beacon of a system such as has been described, for reducing the effective width of the beam of the radar signals, whereby the commencement of the operating period during which said beacon is "on the air" during each revolution of the radar beam, and the interval of time covered by said operating period, are so controlled as to increase the accuracy with which the location in azimuth of said beacon may be determined at the radar station.

These, and other objects and advantages of my present invention, which will be better understood as the detailed description thereof progresses, are attained in the following manner:

Instead of applying the pulse output of the beacon receiver only to the control circuit of the associated transmitter, as has heretofore been the practice, I, in addition, take advantage of the signal-intensity pattern of the radar pulses received as the radar beam sweeps past the beacon, to generate a smooth voltage which is proportional to said signal-intensity pattern. This voltage is applied to a circuit designed to detect any decrease in the magnitude of said voltage after it has reached its maximum value, or a value proportional thereto, and then utilize said decrease to develop a voltage proportional to the difference between substantially said maximum value and some subsequent lesser value, which may be selected as close as desired to said maximum value. The difference voltage thereby obtained is utilized to control the commencement and duration of the period during which the pulse output of the beacon receiver may trigger the beacon transmitter.

Thus, while the received radar signals are sufficiently intense normally to trigger the beacon transmitter over a substantial period of time, extending on both sides of the instant of maximum intensity, the actual operating period of the transmitter may be controlled to commence at any desired time coincident with or following said instant of maximum, and said operating period may be limited to any desired duration, thereby controlling the effective width of the radar beam, and, in so doing, restricting, to any desired degree, the length of the arc on the radar azimuth-range indicator, all of which provides enhanced resolution and accuracy.

In the accompanying specification there are described, and in the annexed drawings shown, what are at present considered preferred embodiments of the systems of my present invention. It is, however, to be clearly understood that my present invention is not limited to said embodiments, inasmuch as changes therein may be made without the exercise of invention and within the true spirit and scope of the claims hereto appended.

In said drawings.

Figure 1:
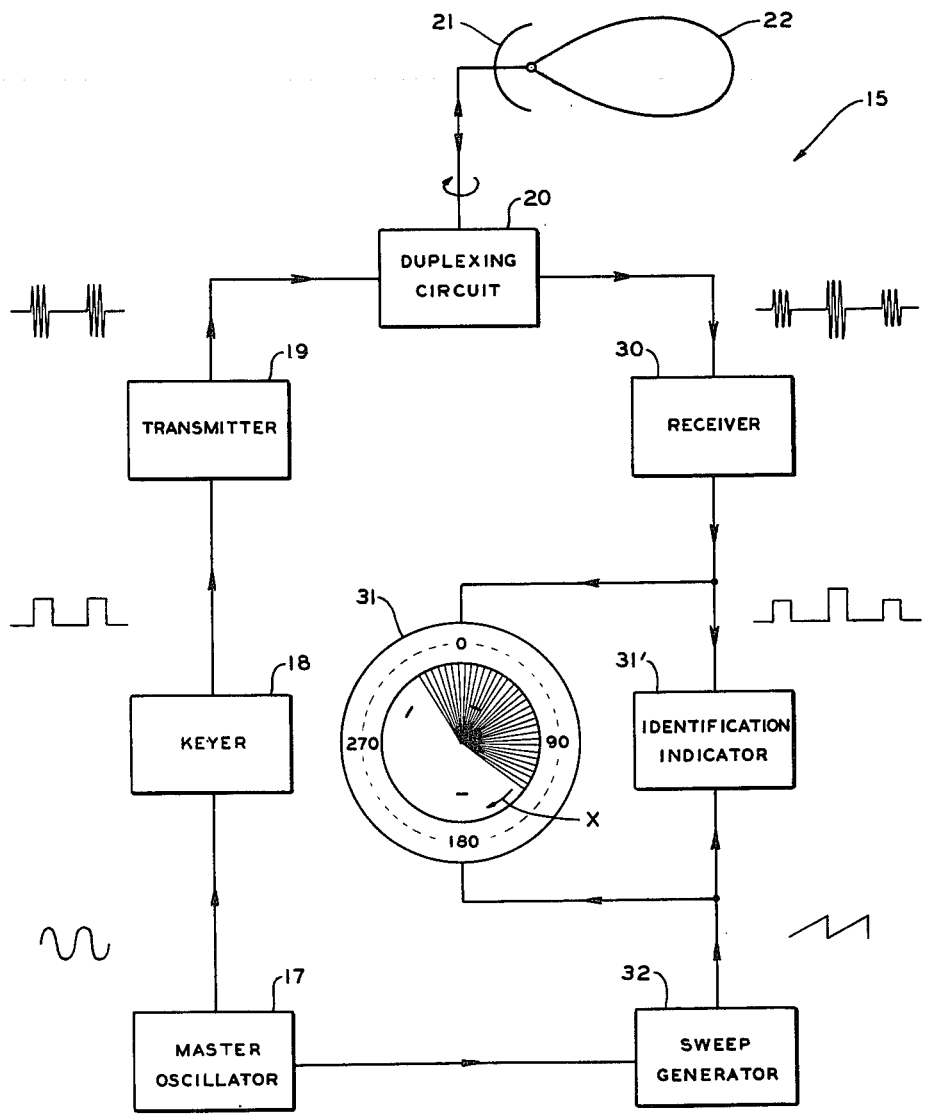
Figures 1 and 2 are block diagrams, respectively, of a radar station and a beacon, assembled in accordance with the principles of my present invention, and showing the approximate voltage wave shapes associated with each of the various components thereof.
Figure 2:
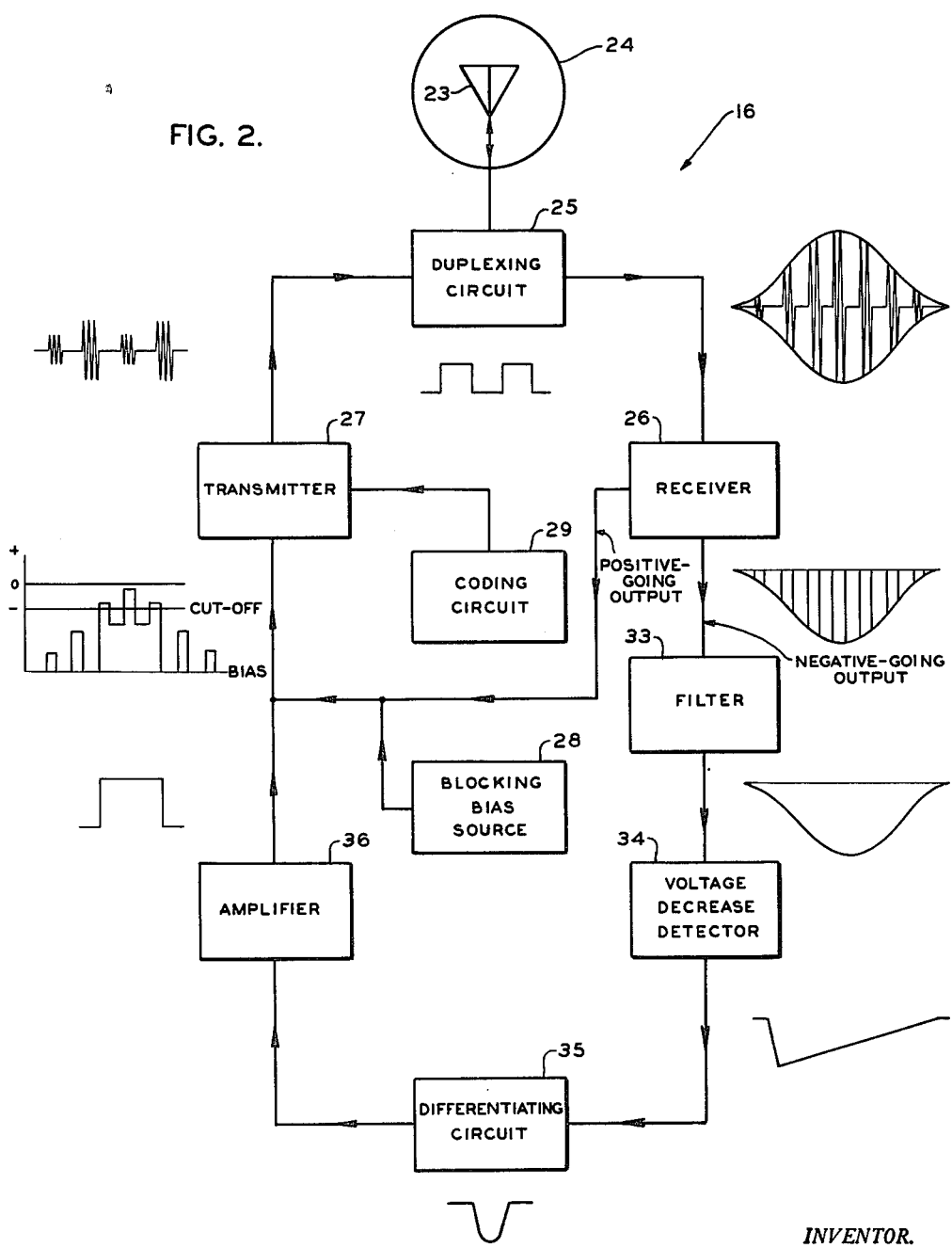

Referring now more in detail to Figures 1 and 2 of the drawings, the numeral 15 generally designates a radar station, and the numeral 16 generally designates a beacon which may be located at any remote point within the range of the radar station, for example, in an airplane, tank, etc., and whose location in azimuth and range it is desired to determine at said radar station.

The radar station includes a stable master oscillator 17 adapted to generate sine-wave oscillations of an audio frequency dependent, in a well known manner, upon the desired range of the system. The output of said oscillator is applied to a keyer 18 wherein said oscillations are distorted to produce substantially flat-topped, narrow pulses. The output of said keyer is applied to a transmitter 19 which is normally inoperative, but which is triggered into operation in synchronism with the pulse input applied thereto from the keyer. The output of the transmitter, consisting of audio-frequency pulses of radio-frequency energy, is conveyed, through a duplexing circuit 20 designed to protect the radar receiver hereinafter referred to from undue shock during the transmission periods, to a rotating directional antenna system 21 having a radiation pattern 22, roughly as shown.

The energy thus radiated is picked up at the beacon 16 by an antenna system 23 having an omnidirectional response pattern 24, and is conveyed, through a duplexing circuit 25, to a receiver 26 for the purpose of recovering therefrom the originally transmitted audio-frequency pulse modulation. The output of the receiver is applied, according to existing practice, exclusively to a transmitter 27 which is normally maintained inoperative by means of a source 28 of blocking bias, but which is adapted to be triggered into operation, under the control of the receiver output, to generate audio-frequency pulses of radio-frequency energy. Said pulses are rendered distinctive by a coding circuit 29, and the final output, constituting response signals, is applied, through the duplexing circuit 25, to the antenna system 23, to be omnidirectionally radiated thereby.

The beacon signals thus radiated are received at the antenna system 21 of the radar station, and are conveyed, through the duplexing circuit 20, to a receiver 30 and the output of the latter is applied, as intensity modulation, to the control grid of a cathode-ray tube 31, constituting the radar azimuth-range indicator. Said cathode-ray tube is provided with a radial sweep generated, in a suitable generator 32, under the control of the master oscillator 17, and said radial sweep is rotated (mechanism therefor not shown), as indicated by the arrow X on the face of the cathode-ray tube, in synchronism with the rotation of the radar antenna system 21. While the drawing actually shows a portion of the rotating radial sweep, said sweep is generally maintained below the visibility level so that the screen displays only the signals received from the beacons, said signals appearing as concentric arcs the lengths of which depend, mainly, upon the width of the radar beam, and the distances of which from the center of the cathode-ray tube, depend upon the range of each detected beacon.

Azimuth is determined by estimating the center of each arc and noting, upon a calibrated scale, the direction of a line passing through the center of the cathode-ray tube and the center of each of said arcs.

The output of the receiver 30 is also applied to a suitable identification indicator 31', which forms no part of my present invention, but which enables the distinctive coding applied to the beacon response signals to be interpreted so as to identify the particular beacon.

Figure 4:
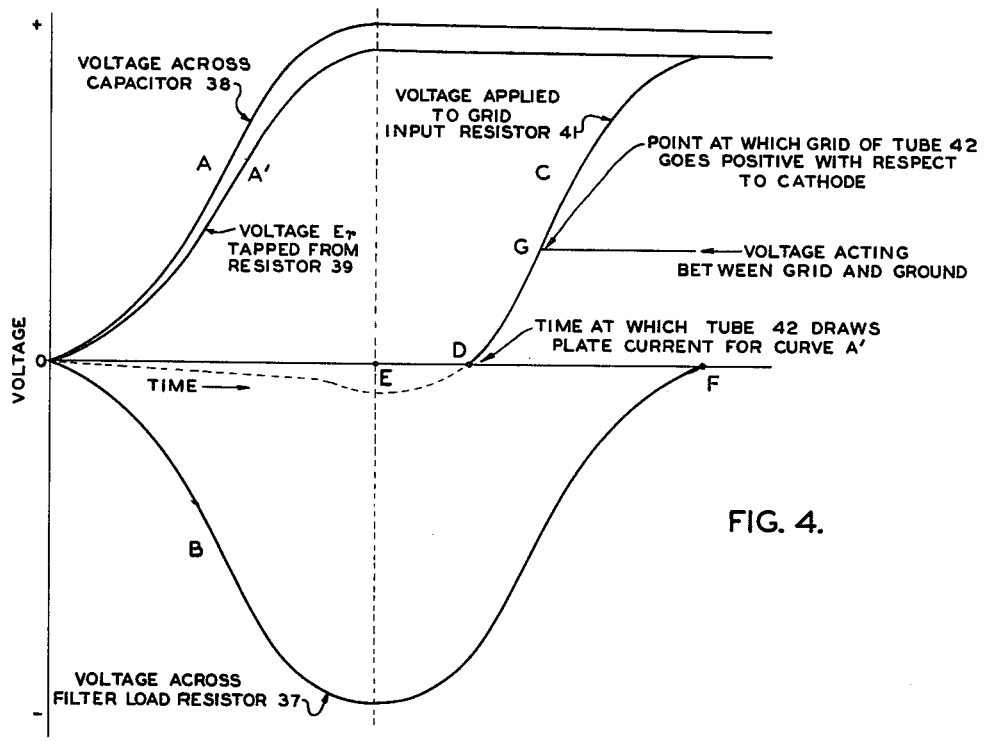
Figure 4 is a graph showing the manner in which the circuit of Figure 3 develops the aforementioned difference-voltage.

In Figure 4 of the drawings, I have plotted, through inverted curve B, the relative intensity against time, of the signals received at the beacon as the radar beam sweeps past the same. Now, the normal operating period of the beacon transmitter depends, for one thing, upon the sensitivity of the beacon receiver and, as this is generally high, it follows that said operating period is an appreciable percentage of the time-width of the pattern. In other words, the relatively wide radar beam triggers the beacon over a considerable time interval, thereby resulting in rather long arcs on the face of the azimuth-range indicator tube of the radar station.

As set forth in earlier portions of this specification, I desire to reduce the effective width of the radar beam at the beacon, and thereby enhance resolution of the azimuth indications, and the accuracy of the azimuth determinations.

This is accomplished as follows: Returning again to Figure 2 of the drawings, it will be noted, that instead of applying the pulse output of the receiver 26 only to the transmitter 27, I also feed said output to a filter 33 designed to pass, essentially, only the signal-intensity pattern. The result is a smooth voltage proportional to the received signal intensity as shown by the inverted curve B of Figure 4. This voltage is applied to a circuit 34, which I have termed a voltage-decrease detector, designed to produce an output only between the time intervening the reception of the radar pulse of maximum intensity, or some later, lesser intensity, and the reception of a selected subsequent radar pulse of a still lesser intensity. The initial voltage intensity to which said circuit responds is, as has been indicated, controllable, and can be selected to coincide with, or follow the maximum voltage intensity as closely in point of time as desired.

The voltage produced during the selected time interval is applied to a differentiating circuit 35 to obtain a pulse of appropriate shape and width, as will later be more fully explained, and this pulse, after passing through a suitable squarer-amplifier 36, is utilized to lift the blocking bias on the transmitter 27 and thereby control the duration of the beacon transmission.

Figure 3:
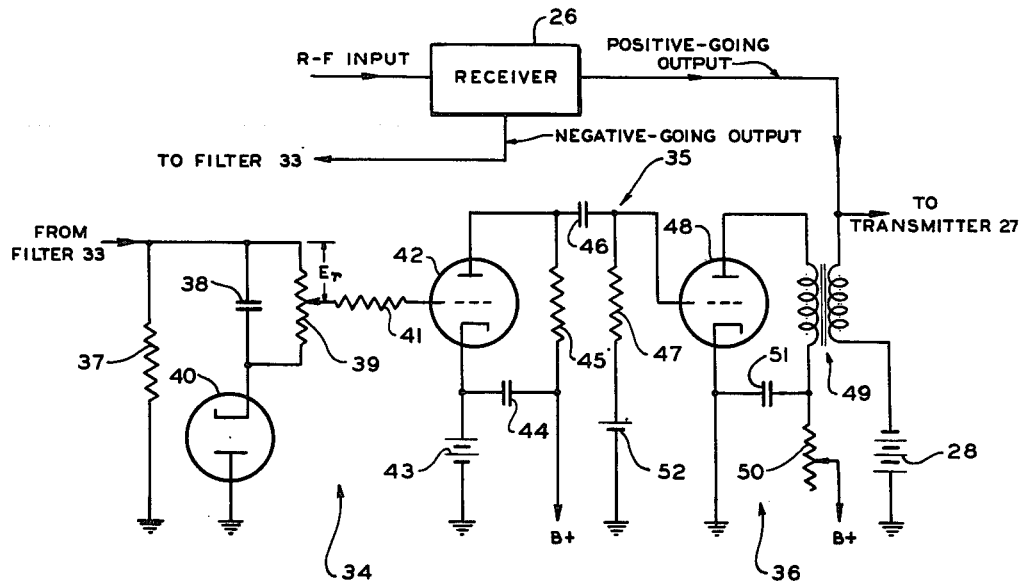
Figure 3 is a circuit diagram of one form of the aforementioned voltage-decrease detector which may be utilized at the beacon to control the effective width of the radar beam.

The voltage-decrease detector 34 may take the form of the circuit shown in Figure 3 of the drawings. The output of the filter 33, which should be negative-going for this particular circuit, but which can be positive-going if said circuit is slightly modified as will be obvious to those skilled in the art, is applied across a network which includes a filter load resistor 37, shunted by a series-parallel network consisting of a capacitor 38, a high-value variable resistor 39, and a diode vacuum tube 40 whose plate is grounded. The sum of the voltage across resistor 37 and that tapped off ($E_r$) from the resistor 39 is applied, preferably through a high-value resistor 41, to the grid of a sharp cut-off vacuum tube 42. The cathode of the tube 42 is biased above ground by means of a battery 43, or some other suitable biasing expedient, whereby said tube is maintained normally at cut-off. The plate of said tube is connected to a suitable B-voltage supply, by-passed by a capacitor 44, through a load resistor 45, and the output across said load resistor is applied to the differentiating network 35 which includes a capacitor 46 and resistor 47 of such values as to result in a short time-constant.

The differentiated output across the resistor 47 is applied to the amplifier 36, consisting of a vacuum tube 48 the cathode of which is grounded and the plate of which is supplied with a suitable potential, preferably, through the primary winding of an audio-frequency output transformer 49, and a variable resistor 50 which is by-passed by a capacitor 51. The potential applied to the plate of said tube should be fairly low, and the grid thereof if preferably maintained slightly positive by means, for example, of a battery 52, so that the output applied to the transmitter 27 is a steep-fronted rectangular pulse. It will be noted that the output across the secondary winding of the transformer 49 is in series with the source 28 of blocking bias, and is also in series with the transmitter-triggering, pulse-output of the receiver 26.

The detailed operation of this circuit is as follows:

As the negative-going smoothly varying output of the filter 33 (curve B of Figure 4) is applied to the detector 34, the capacitor 38 becomes charged positively, through the diode 40, to the maximum value of the applied voltage, as indicated by curve A of Figure 4. The resistor 39 is of so high a value that the capacitor cannot discharge quickly, and it remains substantially at this maximum voltage for a comparatively long period of time. The voltage applied to the grid input resistor 41 is the algrebraic sum of the applied voltage across resistor 37 and the voltage $E_r$ (curve A' of Figure 4) tapped off from resistor 39. It will be noticed that this voltage sum (curve C of Figure 4) is negative until point D is reached, and therefore tube 42 remains in a nonconducting state. After the maximum signal intensity has been reached by the applied voltage, it falls fairly rapidly to zero, while the voltage across the capacitor 38, and therefore $E_r$, remains almost at its peak value. After time D, therefore, the sum of the applied voltage and $E_r$ (curve C) is positive, and the tube 42 draws plate current.

The grid bias and plate voltage of the tube 42, and the output taken across the variable resistor 39, may be adjusted so that plate-current flow starts at any desired time during the interval E—F, such as at time D. As the grid voltage increases further, a point is reached, such as at time G, after which the grid becomes positive with respect to the cathode and begins to draw grid current. The input impedance to the grid being made extremely high with the aid of the resistor 41, the voltage on the grid cannot go positive by more than a very small amount. Plate current therefore remains substantially constant as long as the grid is positive with respect to the cathode. The relationship between the grid voltage and plate current may best be seen by reference to Figure 5.

Figure 5:
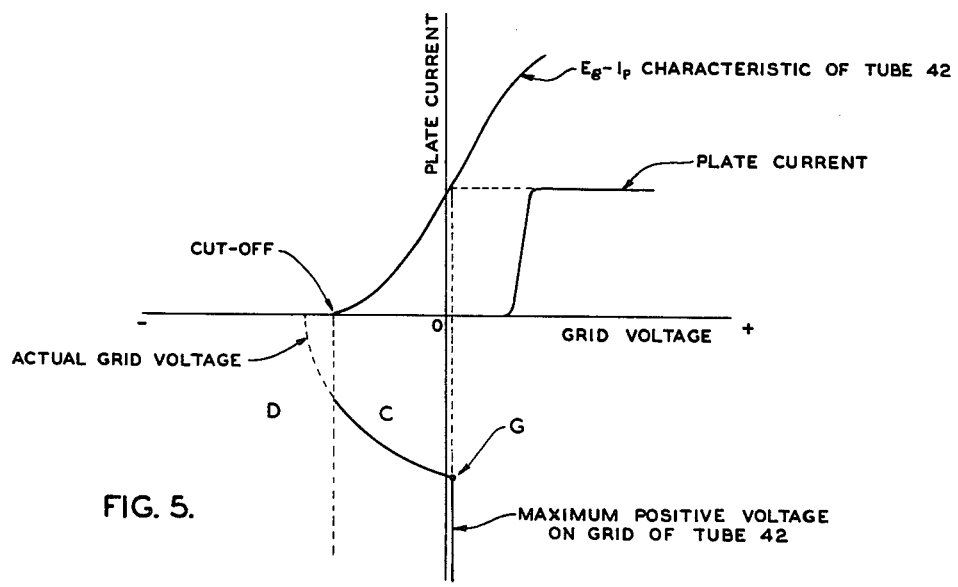
Figure 5 is a graph showing, in part, the manner in which said difference-voltage is utilized to control the commencement and time interval of the output of the circuit of Figure 3.

It is to be noted from said Figure 5 that the plate current rises steeply, and thereafter remains substantially constant. If necessary, the rise can be made even more abrupt for a given maximum of applied voltage by further amplification. This plate current, flowing through the load resistor 45, produces a voltage wave of similar shape, and this voltage, being applied to the short time-constant differentiating circuit 35, results in the more or less rectangular pulse shown beneath said differentiating circuit in Figure 2.

The peaked voltage produced by the differentiating action of the circuit 35 can be regulated in shape by the selection of proper RC constants, especially the width of the pulse near its base.

This peaked voltage is applied to the tube 48, selected for a low value of voltage for cut-off, so that the top of the voltage pulse is clipped to produce a rectangular-shaped voltage pulse across the output load. If desired, by further clipping at either the top or bottom, and further amplification, the rise and fall of this pulse may be made more abrupt. This rectangular voltage pulse, adjustable as to the time of its occurrence, and its duration, by proper design and adjustment of the previously described circuits, removes the bias from the beacon transmitter 27, and permits the triggering thereof by a positive-going output from the receiver 26. Thus, operation of the transmitter occurs at both the correct time and for the desired interval, resulting in the aforementioned enhancement of both accuracy and resolution at the radar station.

If the difference-voltage pulse generated as above is initiated at any time after the peak intensity of the received signal at the beacon, an angular displacement of the indications on the cathode-ray tube 31 at the radar station will occur, but inasmuch as this angular displacement is a constant, it merely requires that the reference line for the measurement of azimuth on said cathode-ray tube be displaced from its normal position by the same angular distance.

Figure 6:
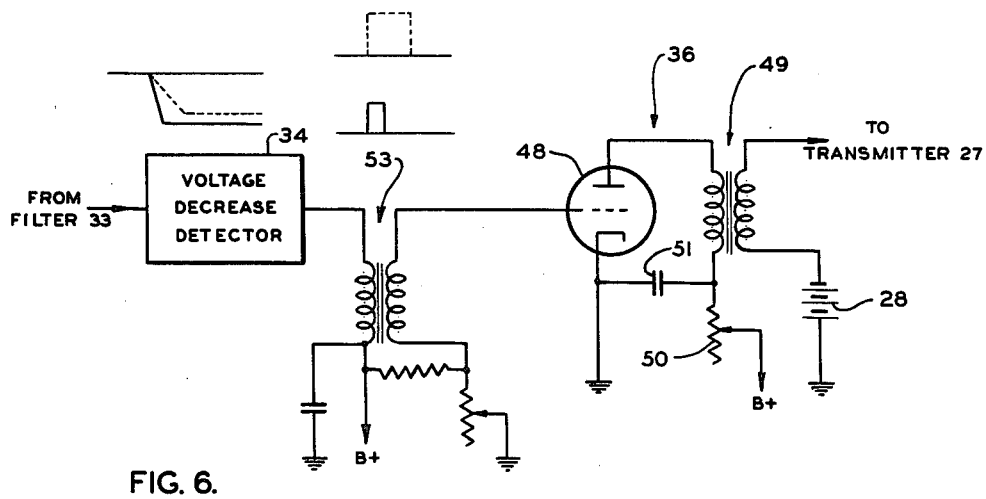
Figure 6 is a schematic diagram of an alternative circuit which may be utilized following the aforementioned voltage-decrease detector for controlling the interval during which the beacon is "on the air."

Reference is now made to the modified circuit shown in Figure 6. I have found, in locating beacons at extreme range, that their response signals sometimes remain undetected on the azimuth-range indicator at the radar station because of their short time interval of operation. I have further found that if the more distant beacons are unblocked or conditioned for response for a longer than the usual period of time, this difficulty is minimized. Such is the purpose of the circuit of Figure 6.

But, before describing this circuit I deem it advisable to explain the theory upon which it is based, and to this end, I return again to the graphs of Figures 4 and 5.

Once the bias conditions of the tube 42 of the circuit 34, and the proportion of the voltage to be applied thereto from across the resistor 39, have been fixed, the time intervening the points D and G on curve C becomes an inverse function of the slope of said curve, and the slope of said curve becomes a direct function of the ratio of the curves A' and B. Now, the greater the amplitude of the exploratory signals received at the beacon, the greater the amplitude of the curves A' and B; and the greater the amplitude of said curves A' and B, the greater their ratio at all times subsequent to their maxima. Therefore, the time intervening the points D and G will be less for beacons close to the radar station than for those which are more distant, and I utilize this fact in the circuit of Figure 6 to maintain the more distant beacons "on the air" for longer time intervals than those which are close by the radar station.

The output voltages from voltage-decrease detectors incorporated in beacons close by and more distant from a radar station are shown, respectively, by the full and broken lines above the detector 34 in Figure 6. These output voltages are applied across low inductance primary windings of transformers 53, with the result that the more steeply fronted voltage is differentiated to produce the narrow pulse shown in full line above said transformer, and the less steeply fronted voltage is differentiated to produce the wider pulse, shown in broken line. Obviously, it is not necessary that a transformer be used for this differentiation, although it is preferable, because of the voltage step-up obtainable through the use thereof.

These pulses, which then appear across the secondary windings of the transformers 53, are amplified, as shown, and each utilized to control the time of the interval during which the blocking biases are lifted from the respective transmitters 27, the wider pulses permitting the more remotely located transmitter to remain "on the air" a longer period of time than is allowed by the narrower pulse at the transmitter located more closely to the radar station.

This completes the descriptions of the aforesaid preferred embodiments of the locating system of my present invention, together with the mode of operation thereof.

It will be noted from all of the foregoing that I have provided a system in which the accuracy and resolution of the azimuth determination is considerably greater than it has heretofore been possible to obtain.

It will further be noted that I am able to attain this increased accuracy and resolution without the necessity of a more elaborate radar radiating system than has heretofore been conventionally employed.

Finally, it will be noted that I have presented simple circuits, adapted to be incorporated in a beacon system, whereby the effective width of the radar beam for triggering the same is reduced, with the result that the operating period during which the beacon is "on the air" is selectively reduced, thereby effecting the aforementioned increased accuracy in determining the azimuthal location of said beacon.

Other objects and advantages of my present invention will readily occur to those skilled in the art to which the same relates.

I claim:

1. A combination with a radio transmitter adapted to respond to triggering signals, remotely generated, and radiated over a rotating directional beam, whereby the intensity thereof varies, as said beam sweeps past the location of said transmitter, from a minimum to a maximum, and back again to said minimum: means, associated with said transmitter and responsive to a variation of intensity from a maximum of said triggering signals, for permitting said triggering signals to operate said transmitter only during a selected restricted portion of the time during which said beam is sweeping past the location of said transmitter; said means including a filter, receptive of said triggering signals, adapted to produce a smooth voltage output whose value is a function of the instantaneous intensity of said triggering signals as said beam sweeps past the location of said transmitter; means for normally biasing said transmitter beyond cutoff by an amount in excess of the peak value of said triggering signals; and means, receptive of the output of said filter, for developing a voltage of predetermined width, and of sufficient magnitude to overcome said cut-off bias, whereby the application thereof to said transmitter permits the latter to respond to said triggering signals.

2. In combination with a radio transmitter adapted to respond to triggering signals, remotely generated, and radiated over a rotating directional beam, whereby the intensity thereof varies, as said beam sweeps past the location of said transmitter, from a minimum to a maximum, and back again to said minimum: means, associated with said transmitter and responsive to a variation of intensity from a maximum of said triggering signals, for permitting said triggering signals to operate said transmitter only during a selected restricted portion of the time during which said beam is sweeping past the location of said transmitter; said means including a filter, receptive of said triggering signals, adapted to produce a smooth voltage output whose value is a function of the instantaneous intensity of said triggering signals as said beam sweeps past the location of said transmitter; means for normally biasing said transmitter beyond cutoff by an amount in excess of the peak value of said triggering signals; means, receptive of the output of said filter and responsive to any decrease from a selected value thereof, for developing a difference-voltage during an interval of time commencing at the instant corresponding to said selected value, and ending at such subsequent instant as said decreasing output reaches a predetermined lesser value; and means, responsive to said difference-voltage, for lifting said cut-off bias from said transmitter, and permitting the latter to respond to said triggering signals.

3. In combination with a radio transmitter adapted to respond to triggering signals, remotely generated, and radiated over a rotating directional beam, whereby the intensity thereof varies, as said beam sweeps past the location of said transmitter, from a minimum to a maximum, and back again to said minimum: means, associated with said transmitter and responsive to a variation of intensity from a maximum of said triggering signals, for permitting said triggering signals to operate said transmitter only during a selected restricted portion of the time during which said beam is sweeping past the location of said transmitter; said means including a filter, receptive of said triggering signals, adapted to produce a smooth voltage output whose value is a function of the instantaneous intensity of said triggering signals as said beam sweeps past the location of said transmitter; means for normally biasing said transmitter beyond cutoff by an amount in excess of the peak value of said triggering signals; means, receptive of the output of said filter and responsive to any decrease from a selected value thereof, for developing a difference-voltage during an interval of time commencing at the instant corresponding to said selected value, and ending at such subsequent instant as said decreasing output reaches a predetermined lesser value; and means, utilizing said difference-voltage, for producing a bias-lifting voltage of selected time duration which, when applied to said transmitter, permits the latter to respond to said triggering signals.

4. In a radio system which includes a central station having means for generating exploratory signals, for radiating said exploratory signals over a directional beam, and means for sweeping said beam through a selected region of space; and a mobile station having means for receiving and rectifying said exploratory signals, means for generating response signals under the triggering action of the rectified exploratory signals, and means for omnidirectionally radiating said response signals; means for controlling the effective width of said directional beam as it sweeps past the location of said mobile station comprising: means for so biasing the signal-generating means of said mobile station that the rectified exploratory signals applied thereto normally cannot trigger the same; means for filtering a portion of said rectified exploratory signals to obtain a smooth voltage whose value is a function of the peak intensity of the exploratory signals being instantaneously received; means, responsive to any decrease from a selected value of the smooth voltage thus obtained, for developing a difference-voltage during an interval of time commencing at the instant corresponding to said selected value, and ending at such subsequent instant as said decreasing voltage reaches a predetermined lesser value; and means, responsive to said difference-voltage, for lifting the aforesaid bias normally applied to the signal-generating means of said mobile station to permit the rectified exploratory signals applied thereto to trigger the same.

5. In a radio system which includes a central station having means for generating exploratory signals, means for radiating said exploratory signals over a directional beam, and means for sweeping said beam through a selected region of space; and a mobile station having means for receiving and rectifying said exploratory signals, means for generating response signals under the triggering action of the rectified exploratory signals, and means for omnidirectionally radiating said response signals; means for controlling the effective width of said directional beam as it sweeps past the location of said mobile station comprising: means for so biasing the signal-generating means of said mobile station that the rectified exploratory signals applied thereto normally cannot trigger the same; means for filtering a portion of said rectified exploratory signals to obtain a smooth voltage whose value is a function of the peak intensity of the exploratory signals being instantaneously received; means, responsive to any decrease from a selected value of the smooth voltage thus obtained, for developing a difference-voltage during an interval of time commencing at the instant corresponding to said selected value, and ending at such subsequent instant as said decreasing voltage reaches a predetermined lesser value; and means, utilizing said difference-voltage, for producing a pulse of selected width which, when applied to the signal-generating means of said mobile station, lifts the aforesaid bias therefrom and permits the rectified exploratory signals to trigger the same.

6. In a radio system which includes a central station having means for generating exploratory signals, means for radiating said exploratory signals over a directional beam, and means for sweeping said beam through a selected region of space; and a mobile station having means for receiving and rectifying said exploratory signals, means for generating response signals under the triggering action of the rectified exploratory signals, and means for omnidirectionally radiating said response signals; means for controlling the effective width of said directional beam as it sweeps past the location of said mobile station comprising: means for so biasing the signal-generating means of said mobile station that the rectified exploratory signals applied thereto normally cannot trigger the same; means for filtering a portion of said rectified exploratory signals to obtain a smooth voltage whose value is a function of the peak intensity of the exploratory signals being instantaneously received; means, responsive to any decrease from a selected value of the smooth voltage thus obtained, for developing a difference-voltage during an interval of time commencing at the instant corresponding to said selected value, and ending at such subsequent instant as said decreasing voltage reaches a predetermined lesser value; and means, utilizing said difference-voltage, for producing a pulse whose width is a function of the field strength of said exploratory signals and which, when applied to the signal-generating means of said mobile station, lifts the aforesaid bias therefrom and permits the rectified exploratory signals to trigger the same.

7. In combination with a radio transmitter adapted to respond to triggering signals, remotely generated, and radiated over a rotating directional beam, whereby the intensity thereof varies, as said beam sweeps past the location of said transmitter, from a minimu mto a miximum, and back again to said minimum: means, associated with said transmitter and responsive to the varying intensity of said triggering signals, for permitting said triggering signals to operate said transmitter only during a selected fraction of the time during which said beam is sweeping past the location of said transmitter; said means including a filter, receptive of said triggering signals, adapted to produce a smooth voltage output whose value is a function of the instantaneous intensity of said triggering signals as said beam sweeps past the location of said transmitter; means for normally biasing said transmitter beyond cutoff by an amount in excess of the peak value of said triggering signals; and means, receptive of the output of said filter, for developing a voltage whose width is a function of the field strength of said triggering signals, and which is of sufficient magnitude to overcome said cut-off bias, whereby the application thereof to said transmitter permits the latter to respond to said triggering signals.

8. In combination with a radio transmitter adapted to respond to triggering signals, remotely generated, and radiated over a rotating directional beam, whereby the intensity thereof varies, as said beam sweeps past the location of said transmitter, from a minimum to a maximum, and back again to said minimum: means, associated with said transmitter and responsive to the varying intensity of said triggering signals, for permitting said triggering signals to operate said transmitter only during a selected fraction of the time during which said beam is sweeping past the location of said transmitter, said means including a filter, receptive of said triggering signals, adapted to produce a smooth voltage output whose value is a function of the instantaneous intensity of said triggering signals as said beam sweeps past the location of said transmitter; means for normally biasing said transmitter beyond cutoff by an amount in excess of the peak value of said triggering signals; means, receptive of the output of said filter and responsive to any decrease from a selected value thereof, for developing a difference-voltage during an interval of time commencing at the instant corresponding to said selected value, and ending at such subsequent instant as said decreasing output reaches a predetermined lesser value; and means, utilizing said difference-voltage, for producing a bias-lifting voltage whose width is a function of the field strength of said triggering signals and which, when applied to said transmitter, permits the latter to respond to said triggering signals.

JAMES SILVERMAN.

References Cited in the file of this patent

UNITED STATES PATENTS

| Number | Name | Date |
| --- | --- | --- |
| 2,252,083 | Luck | Aug. 12, 1941 |
| 2,313,906 | Wendt | Mar. 16, 1943 |
| 2,403,755 | Rankin | July 9, 1946 |
| 2,448,016 | Busignies | Aug. 31, 1948 |
| 2,468,090 | Lundburg | Apr. 26, 1949 |
| 2,492,137 | Dodington | Dec. 27, 1949 |
| 2,513,282 | Busignies | July 4, 1950 |
| 2,557,869 | Gloess | June 19, 1951 |